May 12, 1964  H. L. BOCHMAN, JR  3,132,829
RETRACTABLE AIRCRAFT LANDING GEAR
Filed May 8, 1962
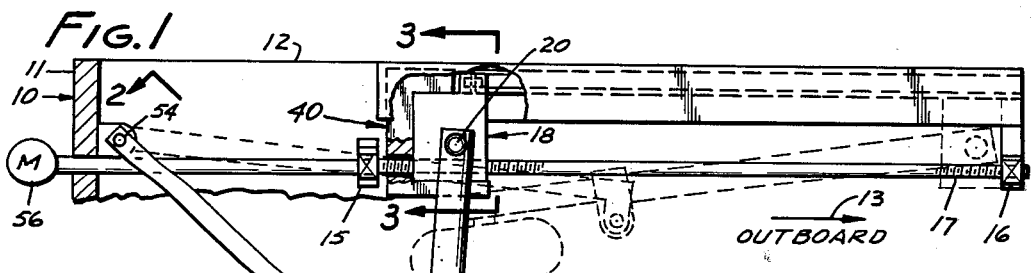
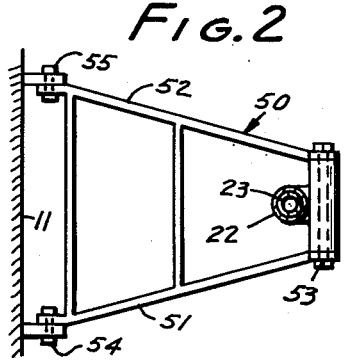
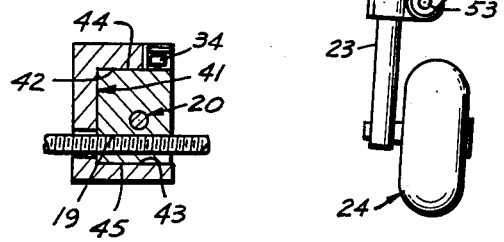
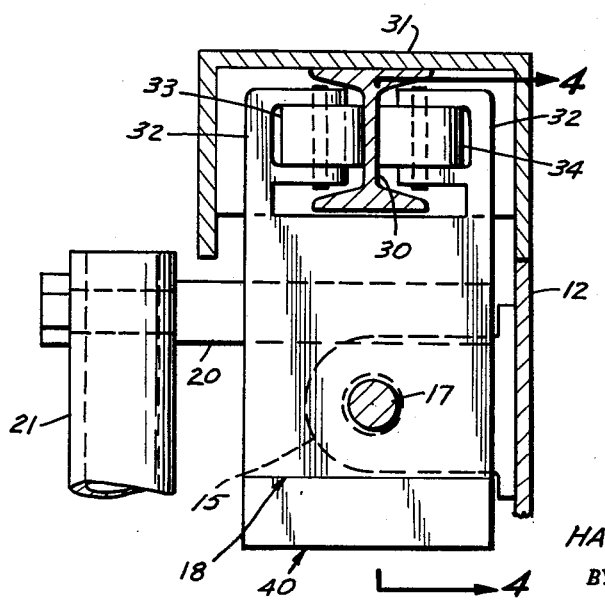
INVENTOR.
HARRY L. BOCHMAN, JR.
BY
ATTORNEYS.

3,132,829
RETRACTABLE AIRCRAFT LANDING GEAR
Harry L. Bochman, Jr., Seal Beach, Calif., assignor to Kirk-Wing Company, Vega Baja, Puerto Rico, a corporation of Puerto Rico
Filed May 8, 1962, Ser. No. 193,274
3 Claims. (Cl. 244—102)

This invention relates to aircraft landing gear.

Particularly for private aircraft, there is a continuing need for landing gear structure which is light in weight and which can be retracted into very close quarters. There have, of course, been numerous attempts to solve this requirement, and many types of landing gears are on the market today. However, there continues to be a need for simplification of these devices so they include fewer parts.

It is an object of this invention to supply a rugged and simple aircraft landing gear which is retractable into a region of minimum envelope bulk.

An aircraft landing gear according to this invention is adapted to be engaged to aircraft structure and to be retractable toward, and be extensible beyond, the structure. It includes a strut adapted to mount a wheel. A rigid link interconnects the aircraft structure and the strut, this link being pivotally jointed to both. A threaded lead screw is rotatably mounted to the aircraft structure. A hinge block includes thread means engaged to the lead screw, so that the hinge block can be shifted inboard and outboard. The strut is pivotally mounted to the hinge block. Means is provided for rotating the lead screw to shift the hinge block and thereby to raise or lower the strut.

According to a preferred but optional feature of the invention, a socket member is attached to the aircraft structure, the socket member being adapted to receive the hinge block when the strut is in its lowermost position so as to transmit landing shock from the strut to the aircraft structure without distorting the lead screw.

The above and other features of this invention will be fully understood from the following detailed description and the accompanying drawings in which:

FIG. 1 is an elevation looking rearwardly toward the tail of an aircraft, and showing the presently preferred embodiment of the invention in its extended and retracted positions;

FIG. 2 is a fragmentary view of a portion of FIG. 1;

FIG. 3 is a cross-section taken at line 3—3 of FIG. 1; and

FIG. 4 is a cross-section taken at line 4—4 of FIG. 3.

FIG. 1 shows aircraft structure 10 including a wing root or bulkhead 11 and lateral spar 12. Arrow 13 indicates the outboard direction from the fuselage. The wing root or bulkhead might be integral with the fuselage or, in larger aircraft, be a station of the wing located outboard from the fuselage.

Two bearings 15, 16 are mounted to the spar, and serve to journal a threaded lead screw 17. A hinge block 18 is threadedly mounted to the lead screw. The drawings illustrate a direct threaded engagement between thread means 19 in the form of integral threads in the block with the threads on the lead screw. However, in the preferred embodiment, thread means 19 will comprise a circulating ball bearing-type nut.

A pivot pin 20 passes through the hinge block and pivotally mounts strut 21 to the hinge block. The strut includes an upper portion 22 and a lower retractable portion 23. The lower portion serves to mount an aircraft wheel and tire assembly 24. The strut, wheel and tire assembly are entirely conventional. They are pivotable around the joint formed by pin 20 in the plane of FIG. 1.

A track 30 comprising an I-beam is attached to an overhanging channel 31 which in turn is attached to the aircraft structure. A yoke 32 on the hinge block supports a pair of roller means 33, 34 which bear against the web of the track, one on each side thereof, to restrain the hinge block to movement in a single plane relative to the aircraft structure.

A socket member 40 is attached to the aircraft structure and includes a cavity 41. The upper portion of the cavity is bounded by an upper surface 42 and the lower portion is bounded by lower surface 43. The hinge block has an upper and lower surface 44, 45, respectively, which are spaced apart by substantially the same distance as that between surfaces 42 and 43, so that when the strut is in its extended position as illustrated, the weight of the strut, when the aircraft is in flight, is carried by the socket through the lower surface without loads on the lead screw, and so that the shock of landing gear and the subsequent weight of the aircraft is transmitted by the socket to the aircraft structure, also without shock on the lead screw at the time of landing. In both cases, distortion of the lead screw is avoided.

A link 50 comprising a pair of arms 51, 52 forming non-parallel arms in fork configuration, which narrow toward a pivot pin joint 53 with the strut, is also mounted to aircraft structure at pivot pin joints 54, 55. The arms 52, 53 provide stability for the device with respect to forward and rearward motion.

All of the pivot joints have an axis of rotation and all of these axes are parallel. It will be observed that the strut may be offset from the hinge block for convenience, although this is not necessary. The offset configuration does reduce the over all bulk of the device by enabling some portions to be placed side by side instead of above one another.

The pivot points as seen in elevation of FIG. 1, are disposed as the apices of a triangle. Retraction and extension of the landing gear is caused by varying the spacing between pivot pin joints 54, 55, and joint 20.

A motor 56, which may be appropriately powered and controlled by appropriate limit switches, is mounted to aircraft structure and connected to the lead screw for rotating the same.

The operation of the device will be evident from the foregoing. With respect to FIG. 1, the lead screw has been rotated so that the hinge block has entered the socket member and at this (extended, solid line) position, the surfaces all make contact so that the shock of landing thrust, or of the transfer of aircraft weight to the lower surfaces, is carried through the hinge block to the socket member, and thus to the aircraft structure without substantial distortion of the lead screw. When the landing gear is to be retracted, the lead screw is turned to move the hinge block to the right to the position shown in dotted line. This causes the strut to raise to its retracted position as shown in dotted line. The cutout portions in a wing required to accommodate this movement are small, and the vertical thickness of the retracted bulk of the landing gear assembly is minimal.

This invention is not to be limited by the embodiment shown on the drawings and described in the description which is given by way of example and not of limitation, but only in accordance with the scope of the appended claims.

I claim:
1. An aircraft landing gear assembly adapted to be engaged to an aircraft structure and to be retractible toward and extensible beyond the structure, comprising: a strut adapted to mount a wheel; a rigid link interconnecting the structure and the strut, said link being pivotally jointed to both; a threaded lead screw having an axis and rotatably mounted to the aircraft structure; a hinge block; thread means carried by said hinge block, said thread means being engaged to the lead screw, the strut being pivotally mounted to the hinge block, the points of pivotal mounting of the strut to the block, the link to the strut, and the link to the structure, forming the apices of a triangle; means for rotating the lead screw to shift the hinge block to vary the spacing between the joints of the strut and the hinge block, and the link and the structure, to raise or lower the strut; a track attached to the structure extending parallel to the lead screw; abutment means carried by the hinge block in sliding abutment with the track to hold the hinge block against rotation; a socket member attached to the structure to receive the hinge block when the strut is in its extended position, said socket member including an upper and a lower planar surface, both parallel to the axis of the lead screw, and the hinge block including an upper and a lower planar surface, both parallel to the axis of the lead screw, the upper surfaces being adapted to make surface-to-surface contact with each other, and the lower surfaces being adapted to make contact with each other, said socket member having an opening in its side; and offset hinge means joining the strut to the hinge block, said hinge means passing through the opening when the strut is in its extended position whereby to leave the lower surfaces unimpeded.

2. Apparatus according to claim 1 in which the hinge means comprises a shank member.

3. Apparatus according to claim 1 in which the track is an I-beam, and the abutment means comprises a yoke supporting a pair of rollers in contact with the opposite sides of the I-beam.

References Cited in the file of this patent
UNITED STATES PATENTS

| | | |
|---|---|---|
| 1,736,226 | Spencer | Nov. 19, 1929 |
| 1,737,596 | Lewis | Dec. 3, 1929 |
| 2,044,368 | Rowe et al. | June 16, 1936 |
| 2,185,235 | Swanson | Jan. 2, 1940 |